(12) United States Patent
Sakai et al.

(10) Patent No.: US 9,643,859 B2
(45) Date of Patent: May 9, 2017

(54) PROCESS FOR PRODUCING CARBONATE COMPOUND AND CATHODE ACTIVE MATERIAL

(71) Applicant: ASAHI GLASS COMPANY, LIMITED, Tokyo (JP)

(72) Inventors: Tomohiro Sakai, Tokyo (JP); Tsubasa Takasugi, Tokyo (JP); Takuya Teratani, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 125 days.

(21) Appl. No.: 14/798,565

(22) Filed: Jul. 14, 2015

(65) Prior Publication Data

US 2015/0318538 A1    Nov. 5, 2015

Related U.S. Application Data

(63) Continuation of application No. PCT/JP2014/053085, filed on Feb. 10, 2014.

(30) Foreign Application Priority Data

Feb. 14, 2013  (JP) .................................. 2013-027043

(51) Int. Cl.
*H01M 10/0525*    (2010.01)
*C01G 53/00*    (2006.01)
(Continued)

(52) U.S. Cl.
CPC ........... *C01G 53/006* (2013.01); *C01G 53/50* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

| 2008/0193841 A1 | 8/2008 | Sun et al. |
| 2010/0151332 A1 | 6/2010 | Lopez et al. |
| (Continued) | | |

FOREIGN PATENT DOCUMENTS

| JP | 2008-535173 | 8/2008 |
| JP | 2011-134708 | 7/2011 |
| (Continued) | | |

OTHER PUBLICATIONS

G. M. Koenig Jr. et al., "Hollow Lithiated Metal Oxide Particles As Lithium-Ion Battery Cathode Materials" Electrochimica Acta 56 (2011) 1426-1431.

(Continued)

*Primary Examiner* — Patrick Ryan
*Assistant Examiner* — Christopher Domone
(74) *Attorney, Agent, or Firm* — Oblon, McClelland, Maier & Neustadt, L.L.P.

(57) ABSTRACT

To provide a carbonate compound and a cathode active material, whereby a lithium ion secondary battery having excellent cycle characteristics can be obtained.
A process for producing a carbonate compound, which comprises mixing a sulfate (A) comprising a sulfate comprising a sulfate of Mn and a sulfate of Ni, or a sulfate comprising a sulfate of Mn, a sulfate of Ni and a sulfate of Co, and a carbonate (B) which is at least one carbonate selected from the group consisting of sodium carbonate and potassium carbonate, in the form of aqueous solutions and controlling the proportion of Mn to the total of Ni, Co and Mn contained in the sulfate (A) to be higher than 65 mol % at the initiation of the mixing, to precipitate a carbonate (Continued)

compound having a proportion of Mn of from 33.3 to 65 mol %, a proportion of Ni of from 17.5 to 50 mol % and a proportion of Co of from 0 to 33.3 mol % to the total of Ni, Co and Mn in the total average composition. A process for producing a cathode active material, which comprises mixing the carbonate compound obtained by the above process and lithium carbonate, followed by firing at from 500 to 1,000° C.

11 Claims, 1 Drawing Sheet

(51) Int. Cl.
    *H01M 4/525*     (2010.01)
    *H01M 4/131*     (2010.01)
    *H01M 4/505*     (2010.01)
    *H01M 4/02*     (2006.01)

(52) U.S. Cl.
    CPC ....... *H01M 4/525* (2013.01); *H01M 10/0525* (2013.01); *C01P 2002/50* (2013.01); *C01P 2002/52* (2013.01); *C01P 2004/03* (2013.01); *C01P 2004/61* (2013.01); *C01P 2006/12* (2013.01); *C01P 2006/40* (2013.01); *H01M 2004/028* (2013.01)

(56) References Cited

U.S. PATENT DOCUMENTS

| | | | |
|---|---|---|---|
| 2013/0216701 A1 | 8/2013 | Lopez et al. | |
| 2013/0344387 A1* | 12/2013 | Endo | H01M 4/505 429/223 |
| 2014/0038053 A1* | 2/2014 | Endo | H01M 4/0471 429/223 |

FOREIGN PATENT DOCUMENTS

| | | |
|---|---|---|
| JP | 2012-511809 | 5/2012 |
| JP | 2012-185913 | 9/2012 |
| WO | WO 2012/091015 | 7/2012 |

OTHER PUBLICATIONS

International Search Report issued May 20, 2014, in PCT/JP2014/053085 filed Feb. 10, 2014.

* cited by examiner

PROCESS FOR PRODUCING CARBONATE COMPOUND AND CATHODE ACTIVE MATERIAL

TECHNICAL FIELD

The present invention relates to a process for producing a carbonate compound, a process for producing a cathode active material, a cathode for a lithium ion secondary battery and a lithium ion secondary battery.

BACKGROUND ART

Lithium ion secondary batteries are widely used for portable electronic instruments such as cell phones or notebook-size personal computers. As a cathode active material for a lithium ion secondary battery, a cathode active material comprising a composite oxide of Li with a transition metal element (such as $LiCoO_2$, $LiNiO_2$, $LiNi_{0.8}Co_{0.2}O_2$ or $LiMn_2O_4$) is known.

As a process for producing a cathode active material, for example, a process is known such that a sulfate of a transitional metal element such as a sulfate of Mn and a carbonate such as sodium carbonate are mixed in the form of aqueous solutions, to obtain a carbonate compound containing the transitional metal element, and then the carbonate compound and lithium carbonate are mixed, followed by firing (Non-Patent Document 1).

However, in the production of a cathode active material which employs the process as disclosed in Non-Patent Document 1, particularly in a case where the proportion of Mn is lowered in order to increase discharge capacity, the particle size, the particle shape, etc. of the cathode active material tend to be ununiform, and voids are easily formed in the cathode active material. Such a cathode active material quickly deteriorates, and it is difficult to obtain a lithium ion secondary battery which is excellent in characteristics that the discharge capacity and the average discharge voltage will not substantially decrease after repeating the charge and discharge cycle (hereinafter referred to also as "cycle characteristics").

PRIOR ART DOCUMENT

Non-Patent Document

Non-Patent Document 1: Electrochimica Acta 56 (2011) 1426-1431

DISCLOSURE OF INVENTION

Technical Problem

The present invention provides a process for producing a carbonate compound and a process for producing a cathode active material, whereby the excellent cycle characteristics can be obtained. Further, the present invention provides a cathode for a lithium ion secondary battery, which uses a cathode active material obtained by the above production process and a lithium ion secondary battery.

Solution to Problem

The present invention has the following constructions.
(1) A process for producing a carbonate compound, which comprises mixing the following sulfate (A) and the following carbonate (B) in the form of aqueous solutions and controlling the proportion of Mn to the total of Ni, Co and Mn contained in the sulfate (A) to be higher than 65 mol % at the initiation of the mixing, to precipitate a carbonate compound having a proportion of Mn of from 33.3 to 65 mol %, a proportion of Ni of from 17.5 to 50 mol % and a proportion of Co of from 0 to 33.3 mol % to the total of Ni, Co and Mn in the total average composition:

sulfate (A): a sulfate comprising a sulfate of Mn and a sulfate of Ni, or a sulfate comprising a sulfate of Mn, a sulfate of Ni and a sulfate of Co, and carbonate (B): at least one carbonate selected from the group consisting of sodium carbonate and potassium carbonate.

(2) The process for producing a carbonate compound according to the above (1), wherein at the time of mixing the sulfate (A) and the carbonate (B), the pH of the mixed solution in a mixing tank is maintained at from 7 to 12.

(3) The process for producing a carbonate compound according to the above (1) or (2), wherein the concentration of transitional metal element (X) comprising Mn, Ni and Co in the aqueous solution of the sulfate (A) is from 0.1 to 3 mol/kg.

(4) The process for producing a carbonate compound according to any one of the above (1) to (3), wherein the concentration of the carbonate (B) in the aqueous solution of the carbonate (B) is from 0.1 to 2 mol/kg.

(5) The process for producing a carbonate compound according to any one of the above (1) to (4), which comprises mixing the sulfate (A) and the carbonate (B) in the form of aqueous solutions, and controlling in a first precipitation step, the proportion of Mn to the total of Ni, Co and Mn contained in the sulfate (A) to be higher than 65 mol % and controlling in a second precipitation step, the proportion of Mn to the total of Ni, Co and Mn contained in the sulfate (A) to be less than 65 mol %, to precipitate a carbonate compound having the proportion of Mn of from 33.3 to 65 mol %, the proportion of Ni of from 17.5 to 50 mol % and the proportion of Co of from 0 to 33.3 mol % to the total of Ni, Co and Mn in the total average composition.

(6) The process for producing a carbonate compound according to the above (5), wherein in the first precipitation step, the proportion of Mn in the sulfate (A) is higher than 65 mol % and at most 100 mol %, the proportion of Ni is from 0 to 35 mol %, and the proportion of Co is from 0 to 33.3 mol %.

(7) A process for producing a cathode active material, which comprises mixing the carbonate compound obtained by the process as defined in any one of the above (1) to (6) and lithium carbonate, followed by firing at from 500 to 1,000° C.

(8) The process for producing a cathode active material according to the above (7), wherein the number of moles of Li contained in the lithium carbonate is from 1.1 to 1.4 times the number of moles of the total of Ni, Co and Mn contained in the carbonate compound.

(9) The process for producing a cathode active material according to the above (7) or (8), wherein the cathode active material to be obtained is a compound (1) represented by the following formula (1):

$$Li_{1+a}Ni_bCo_cMn_dM'_eO_{2+f} \tag{1}$$

wherein M' is at least one member selected from the group consisting of Mg, Ca, Sr, Ba and Al; a to e are respectively $0.1 \le a \le 0.4$, $0.175 \le b \le 0.5$, $0 \le c \le 0.333$, $0.333 \le d \le 0.65$, $0 \le e \le 0.05$, $0.9 \le b+c+d \le 1.05$; and f is a numerical value to be determined depending on the valence of Li, Ni, Co, Mn and M'.

(10) A cathode for a lithium ion secondary battery, comprising a cathode current collector and a cathode active material layer formed on the cathode current collector, wherein the cathode active material layer contains the cathode active material obtained by the process as defined in the above (7) to (9), an electrically conductive material and a binder.

(11) A lithium ion secondary battery comprising the cathode for a lithium ion secondary battery as defined in the above (10), an anode and a non-aqueous electrolyte.

Advantageous Effects of Invention

According to the process for producing a carbonate compound of the present invention, a carbonate compound can be produced which can provide a cathode active material whereby excellent cycle characteristics can be obtained.

According to the process for producing a cathode active material of the present invention, a cathode active material can be produced whereby excellent cycle characteristics can be obtained.

By using the cathode for a lithium ion secondary battery of the present invention, a lithium ion secondary battery can be obtained which is excellent in cycle characteristics.

The lithium ion secondary battery of the present invention is excellent in cycle characteristics.

DESCRIPTION OF EMBODIMENTS

Process for Producing Carbonate Compound

Figure 1:
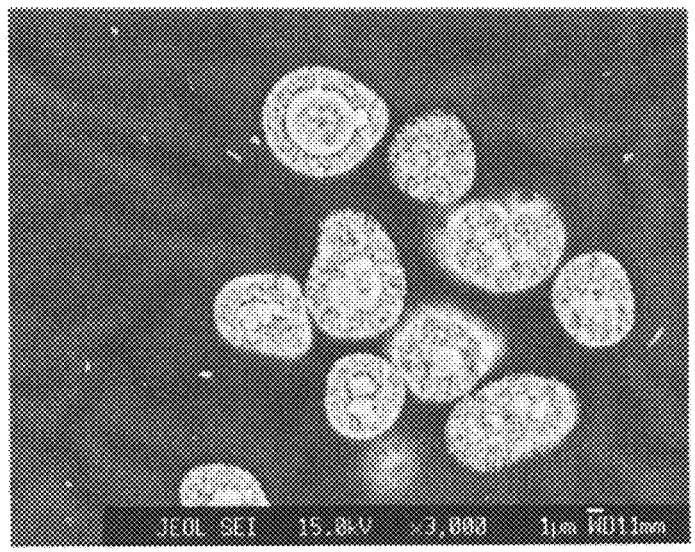
FIG. 1 is a scanning electron microscope photograph showing a cross section of the cathode active material of Ex. 3.

The process for producing a carbonate compound of the present invention is a process for producing a carbonate compound having a proportion of Mn of from 33.3 to 65 mol %, a proportion of Ni of from 17.5 to 50 mol % and a proportion of Co of from 0 to 33.3 mol % to the total of Ni, Co and Mn in the total average composition. Hereinafter, Mn, Ni and Co may sometimes be collectively represented by "transitional metal element (X)".

In the carbonate compound to be obtained by the production process of the present invention, the proportion of Mn is preferably from 40 to 65 mol %, the proportion of Ni is preferably from 27.7 to 50 mol %, and the proportion of Co is preferably from 0 to 20 mol %; and the proportion of Mn is particularly preferably from 43.3 to 60 mol %, the proportion of Ni is particularly preferably from 33.7 to 50 mol %, and the proportion of Co is particularly preferably from 0 to 13.3 mol %, to the total of Ni, Co and Mn in the total average composition.

When the proportions of Ni, Co and Mn in the total average composition fall within the above ranges, as described after, by mixing a carbonate compound and lithium carbonate, followed by firing, a cathode active material excellent in cycle characteristics can be obtained.

In the process for producing a carbonate compound of the present invention, the after-mentioned sulfate (A) and the after-mentioned carbonate (B) are mixed in the form of aqueous solutions to precipitate a carbonate compound. In the present invention, as a case requires, an additive may be used.

The sulfate (A) is a sulfate comprising a sulfate of Mn and a sulfate of Ni, or a sulfate comprising a sulfate of Mn, a sulfate of Ni and a sulfate of Co.

The sulfate of Mn may, for example, be manganese(II) sulfate pentahydrate or ammonium manganese(II) sulfate hexahydrate.

The sulfate of Ni may, for example, be nickel(II) sulfate hexahydrate, nickel(II) sulfate heptahydrate or ammonium nickel(II) sulfate hexahydrate.

The sulfate of Co may, for example, be cobalt(II) sulfate heptahydrate or ammonium cobalt(II) sulfate hexahydrate.

As the sulfate (A), one type may be used, or two or more types may be used.

The sulfate (A) is preferably the sulfate comprising a sulfate of Mn, a sulfate of Ni and a sulfate of Co, from the viewpoint of easily obtaining a cathode active material having a high discharge capacity.

Further, in the process for producing a carbonate compound of the present invention, in addition to the sulfate (A), a sulfate of another metal element (M') other than Ni, Co and Mn, may be used. The sulfate of another metal element (M') is preferably at least one member selected from the group consisting of a sulfate of Mg, a sulfate of Ca, a sulfate of Sr, a sulfate of Ba and a sulfate of Al.

The carbonate (B) is at least one carbonate selected from the group consisting of sodium carbonate and potassium carbonate. The carbonate (B) also has a role as a pH adjuster for precipitating a carbonate of the transitional metal element (X).

At the time of mixing the sulfate (A) and the carbonate (B), the pH of the mixed solution in a mixing tank is preferably maintained at from 7 to 12, more preferably maintained at from 7.5 to 9. When the pH is at least the lower limit, the composition tends not to be ununiform. When the pH is at most the upper limit, a carbonate compound made of spherical particles is easily produced.

The method for mixing the sulfate (A) and the carbonate (B) in the form of aqueous solutions is not particularly restricted, so long as the sulfate (A) and the carbonate (B) are in the form of aqueous solutions at the time of mixing.

Specifically, it is preferred that an aqueous solution of the sulfate (A) and an aqueous solution of the carbonate (B) are added together continuously to a mixing tank, since a carbonate compound easily precipitates, and the particle size can be easily controlled. It is preferred that to the mixing tank, ion exchanged water, pure water, distilled water or the like is preliminary added, and it is more preferred that the pH is preliminary controlled by using the carbonate (B), the after-mentioned additive or the like.

In a case where at least two types of the sulfate (A) are used, as the aqueous solution of the sulfate (A), at least two aqueous solutions separately independently containing such at least two sulfates (A) may be used, or one type of an aqueous solution containing at least two sulfates (A) may be used. Further, an aqueous solution containing one sulfate (A) and an aqueous solution containing at least two types of sulfate (A) may be used in combination. The same applies in a case where at least two types of the carbonate (B) are used.

The process for producing a carbonate compound of the present invention has a feature that the proportion of Mn to the total of Ni, Co and Mn contained in the sulfate (A) is higher than 65 mol % at the initiation of the mixing. That is, the process for producing a carbonate compound of the present invention has a feature that a sulfate (A) having a proportion of Mn of higher than 65 mol % to the total of Ni, Co and Mn is used, and the sulfate (A) and a carbonate (B) are mixed in the form of aqueous solutions to initiate precipitation of a carbonate compound (hereinafter referred to also as "first precipitation step").

After the precipitation reaction using the sulfate (A) having a proportion of Mn of higher than 65 mol %, the proportion of Mn in the sulfate (A) is controlled to further carry out a precipitation reaction, and the proportion of Mn, the proportion of Ni and the proportion of Co to the total of Ni, Co and Mn in the total average composition of the carbonate compound are controlled so as to be the desired proportions (hereinafter, referred to as "second precipitation step").

(First Precipitation Step)

In the first precipitation step, the sulfate (A) has a proportion of Mn of higher than 65 mol % to the total of Ni, Co and Mn, more preferably has a proportion of Mn of higher than 65 mol % and at most 100 mol %, a proportion of Ni of from 0 to 35 mol % and a proportion of Co of from 0 to 33.3 mol %, and particularly preferably has a proportion of Mn of from 66 to 85 mol %, a proportion of Ni of from 15 to 34 mol % and a proportion of Co of from 0 to 20 mol %. When the proportion of Mn is higher than 65 mol %, a carbonate compound having a uniform particle size and good particle shape in which the formation of voids is suppressed, can be obtained. When the proportions of Mn, Ni and Co fall within the above ranges, a cathode active material which is excellent in the discharge capacity, the discharge voltage and the cycle characteristics, is easily obtained.

The time for precipitating a carbonate compound using a sulfate (A) having an Mn proportion of higher than 65 mol % is preferably from 0.5 to 50 hours, more preferably from 1 to 30 hours. When the precipitation reaction time is at least the lower limit, a carbonate compound having a uniform particle size and good particle shape in which the formation of voids is suppressed, is easily obtained. When the precipitation reaction time is at most the upper limit, the particle size of the carbonate compound is easily controlled within the after-mentioned preferred range.

(Second Precipitation Step)

In the second precipitation step, the sulfate (A) is required to have an Mn proportion of less than 65 mol % to the total of Ni, Co and Mn.

In the second precipitation step, the proportion of Mn of the sulfate (A) to the total of Ni, Co and Mn may be constant or may be continuously or intermittently lowered. Further, after the proportion of Mn becomes less than 65 mol %, the second precipitation step may have a period that the proportion of Mn in the sulfate (A) is continuously or intermittently increased or may have a period that the proportion of Mn in the sulfate (A) is higher than the proportion of the Mn at the initiation of mixing.

In the production process of the present invention, it is preferred that in the second precipitation step, the proportion of Mn in the sulfate (A) is constant at a level of less than 65 mol %.

Further, in the production process of the present invention, the proportion of Mn may be continuously or intermittently lowered in the first precipitation step and the second precipitation step.

Further, in the production process of the present invention, after the second precipitation step, it is preferred to carry out a precipitation reaction in which the proportion of Mn of the sulfate (A) is fixed at the desired proportion to make a carbonate compound grow until the desired particle size. By controlling the particle size of the carbonate compound after controlling the proportion of Mn as described above, the particle size of the carbonate compound can be easily controlled, as compared with a case where the proportion of Mn and the particle size are simultaneously controlled.

The concentration of the transitional metal element (X) in the aqueous solution of the sulfate (A) is preferably from 0.1 to 3 mol/kg, more preferably from 0.5 to 2.5 mol/kg. When the concentration is at least the lower limit, the productivity is high. When the concentration is at most the upper limit, the sulfate (A) is easily and sufficiently dissolved.

In a case where at least two types of aqueous solutions containing the sulfate (A) are used, the concentration of the transitional metal element (X) in each aqueous solution is preferably adjusted within the above range.

The concentration of the carbonate (B) in the aqueous solution of the carbonate (B) is preferably from 0.1 to 2 mol/kg, more preferably from 0.5 to 2 mol/kg. When the concentration of the carbonate (B) falls within the above range, a carbonate compound is easily precipitated.

In a case where at least two types of aqueous solutions containing the carbonate (B) are used, the concentration of the carbonate (B) in each aqueous solution is preferably adjusted within the above range.

The solvent used for aqueous solutions of the sulfate (A) and the carbonate (B), water may be used solely so long as the sulfate (A) and the carbonate (B) are dissolved, or an aqueous medium containing water and another component other than water may be used.

Such another component other than water may, for example, be methanol, ethanol, 1-propanol, 2-propanol or a polyol. The polyol may, for example, be ethylene glycol, propylene glycol, diethylene glycol, dipropylene glycol, polyethylene glycol, butanediol or glycerol.

The proportion of the component other than water in the aqueous medium is preferably from 0 to 20 mass %, more preferably from 0 to 10 mass %, particularly preferably from 0 to 1 mass %, and it is most preferred that such another component is not contained. When the proportion of the component other than water is at most the above upper limit, such an aqueous medium is excellent from the viewpoint of environment, handling efficiency and cost.

The sulfate (A) and the carbonate (B) in the form of aqueous solutions are preferably mixed in a mixing tank under stirring.

The stirrer may, for example, be a three-one motor. The stirring vane may, for example, be an anchor-type stirring vane, a propeller-type stirring vane or a paddle type stirring vane.

The temperature of the mixed solution at the time of mixing the sulfate (A) and the carbonate (B) is preferably from 20 to 80° C., more preferably from 25 to 60° C., since a carbonate compound is easily precipitates.

Further, the sulfate (A) and the carbonate (B) are preferably mixed under a nitrogen atmosphere or an argon atmosphere from the viewpoint of suppressing oxidation of a carbonate compound to be precipitated, and particularly preferably mixed under the nitrogen atmosphere from the viewpoint of cost.

As an additive, for example, in order to control pH or the solubility of the transitional metal element (X), ammonia or ammonium salt may be used. The ammonium salt may, for example, be ammonium chloride, ammonium sulfate or ammonium nitrate.

Ammonia or the ammonium salt is preferably supplied in a mixed solution at the same time of supplying the sulfate (A)

After precipitating the carbonate compound, the aqueous solution is preferably removed by filtration or centrifugal separation. As the filtration or the centrifugal separation, a pressure filter, a vacuum filter, a centrifugal classifier, a filter press, a screw press, a rotary type dehydrator or the like may be used.

The obtained carbonate compound is preferably washed in order to remove impurity ions. The method for washing the carbonate compound may, for example, be a method of repeating filtration under pressure and dispersion in distilled water.

The obtained carbonate compound is preferably dried. Particularly, in the case where the carbonate compound is washed, the carbonate compound is preferably dried after washing.

The drying temperature of the carbonate compound is preferably from 60 to 200° C., more preferably from 80 to 130° C. When the drying temperature is at least the lower limit, the carbonate compound can be dried in short time. When the drying temperature is at most the upper limit, the carbonate compound can be easily suppressed from being oxidized.

The time for drying the carbonate compound is preferably from 1 to 300 hours, more preferably from 5 to 120 hours.

The particle size $D_{50}$ of the obtained carbonate compound is preferably from 3 to 15 μm, more preferably from 6 to 15 μm, particularly preferably from 6 to 12 μm. When the $D_{50}$ of the carbonate compound falls within the above range, a high discharge capacity is easily obtained.

Here, "$D_{50}$" in the present invention means a volume-based cumulative 50% size which is a particle size at a point of 50% on an accumulative volume distribution curve when the accumulative volume distribution curve is drawn by obtaining the particle size distribution on the volume basis and taking the whole to be 100%. The particle size distribution is obtained from the frequency distribution and accumulative volume distribution curve measured by means of a laser scattering particle size distribution measuring apparatus. The measurement of particle sizes is carried out by sufficiently dispersing the powder in an aqueous medium by an ultrasonic treatment and measuring the particle size distribution (for example, by means of a laser diffraction/scattering type particle size distribution measuring apparatus Partica LA-950VII, manufactured by HORIBA Ltd). Similarly, $D_{10}$ and $D_{90}$ mean a volume-based cumulative 10% size and a volume-based cumulative 90% size which are a particle size at a point of 10% on an accumulative volume distribution curve and a particle size at a point of 90% on an accumulative volume distribution curve.

($D_{90}/D_{10}$) which is the ratio of the particle size $D_{90}$ of the carbonate compound to the particle size $D_{10}$ is preferably at most 2.5, more preferably at most 2.3, particularly preferably at most 2.1. When the $D_{90}/D_{10}$ of the carbonate compound is at most the upper limit, a cathode active material whereby excellent cycle characteristics can be obtained, tends to be obtained. The lower limit of the $D_{90}/D_{10}$ of the carbonate compound is preferably at least 1.

The specific surface area of the carbonate compound is preferably from 50 to 300 m²/g, particularly preferably from 100 to 250 m²/g. When the specific surface area of the carbonate compound falls within the above range, the specific surface area of a cathode active material is easily controlled within the after-mentioned preferred range, and a cathode active material having a high discharge capacity is easily obtained.

The specific surface area of the carbonate compound is measured by a method described in Examples.

The carbonate compound to be obtained by the production process of the present invention has at the central part of particles, a high concentration region (hereinafter referred to also as "high concentration region (H')") where the proportion of Mn in the transitional metal element (X) is higher than 65 mol % and at the outside of the high concentration region (H'), a low concentration region (hereinafter referred to also as "low concentration region (L')") where the proportion of Mn is lower than 65 mol %. The carbonate compound has a low concentration region (L') at the outside of a high concentration region (H'), whereby the total average composition is controlled within the desired range.

In the high concentration region (H'), it is preferred that in the transitional metal element (X), the proportion of Mn is higher than 65 mol % and at most 100 mol %, the proportion of Ni is from 0 to 35 mol %, and the proportion of Co is from 0 to 33.3 mol %, and it is particularly preferred that the proportion of Mn is from 66 to 85 mol %, the proportion of Ni is from 15 to 34 mol %, and the proportion of Co is from 0 to 20 mol %. Within the above ranges, a carbonate compound having a uniform particle size and good particle shape in which the formation of voids is suppressed, is easily obtained.

The proportion of Mn, the proportion of Ni and the proportion of Co in the high concentration region (H') can be evaluated by carrying out elemental analysis by means of energy dispersive X-ray spectrometry (EDX) or electron probe microanalyzer (EPMA).

In the high concentration region (H'), the proportion of Mn may be constant, or the proportion of Mn may continuously or intermittently decrease toward the outside. Further, the high concentration region (H') may have a part such that the proportion of Mn continuously or intermittently increases toward the outside.

In the carbonate compound to be obtained by the production process of the present invention, the proportion of Mn in the high concentration region (H') is preferably constant, since the production is easy, and a cathode active material which is excellent in cycle characteristics is easily obtained.

In the transitional metal element (X) in the low concentration region (L'), the proportion of Ni, the proportion of Co and the proportion of Mn are not particularly restricted, so far as the proportion of Mn, the proportion of Ni and the proportion of Co to the total of Ni, Co and Mn in the total average composition of the carbonate compound fall within the above ranges.

In the low concentration region (L'), the proportion of Mn may be constant, or the proportion of Mn may continuously or intermittently decrease toward the outside. Further, the low concentration region (L') may have a part such that the proportion of Mn continuously or intermittently increase toward the outside.

Further, the low concentration region (L') may partially have a region such that the proportion of Mn is the same as or higher than the proportion of Mn of the high concentration region (H').

As described above, in the process for producing a carbonate compound of the present invention, the mixing is initiated by using a sulfate (A) having a proportion of Mn of higher than 65 mol % to the total of Ni, Co and Mn, whereby a carbonate compound having a uniform particle size and good shape in which the formation of voids is suppressed, can be obtained. What the formation of voids is suppressed in an obtained carbonate compound can be confirmed, for example, by observing cross section by a scanning electron microscope (SEM), as described in Examples. The reason why such effects can be obtained is considered as follows.

If in a precipitation reaction of a carbonate compound, the proportion of Mn in a sulfate to be used is low, a carbonate of a transitional metal element quickly agglomerates in an initial stage of the reaction. Thus, the particle size and the particle shape of a carbonate compound to be obtained tend to be ununiform, and it is considered that particles having an irregular shape which are formed by the agglomeration at the initial stage of the reaction gather, whereby a carbonate compound having voids tends to be formed.

On the other hand, in the present invention, the proportion of Mn in the sulfate (A) is higher than 65 mol % in the initial stage of the precipitation, whereby carbonates of transitional metal elements can be suppressed from rapidly agglomerating in the initial stage of the reaction. Thus, good spherical nuclei having no void are formed in the initial stage of the reaction, and then even though the proportion of Mn is low, a carbonate compound grows with the center of good spherical nuclei, a carbonate compound having a uniform particle size and good shape in which the formation of voids is suppressed, can be formed.

In the after-mentioned lithium ion secondary battery, if the particle size and the particle shape of a cathode active material are ununiform, or a cathode active material have voids, voltage applied on each particle is ununiform, and a cathode active material thereby tends to deteriorate. Further, a cathode active material having a too large particle size and a cathode active material having voids may collapse at a time of forming a cathode active material layer in some cases. Further, if a cathode active material having voids is used, the density of a cathode active material layer becomes small, and thereby energy to be obtained per unit volume of the cathode active material layer is small.

By using a carbonate compound obtained by the production process of the present invention, a cathode active material having a uniform particle size and good shape in which the formation of voids is suppressed, can be obtained. Accordingly, by using a cathode active material obtained by the after-mentioned production process of the present invention, a secondary battery having a sufficient discharge capacity and excellent cycle characteristics can be obtained.

<Process for Producing a Cathode Active Material>

In the process for producing a cathode active material of the present invention, a carbonate compound to be obtained by the above-described production process and lithium carbonate are mixed and fired at from 500 to 1,000° C. to obtain a cathode active material.

The method for mixing a carbonate compound and lithium carbonate may, for example, be a method of using a rocking mixer, a Nauta mixer, a spiral mixer, a cutter mill, a V-mixer or the like.

The number of moles of Ni contained in lithium carbonate is preferably from 1.1 to 1.4 times, more preferably from 1.1 to 1.25 times per the total moles of Ni, Co and Mn contained in the carbonate compound. When the number of moles of Li falls within the above range, a high discharge capacity is easily obtained.

As the firing apparatus, an electric furnace, a continuous firing furnace, a rotary kiln or the like may be used. The firing is preferably carried out under atmosphere, particularly preferably carried out while supplying air, since a carbonate compound is oxidized at the time of firing.

The rate of supplying air is preferably from 10 to 200 mL/min, more preferably from 40 to 150 mL/min per the internal volume 1 L of the furnace.

By supplying air at the time of firing, the transitional metal element (X) in the carbonate compound is sufficiently oxidized, whereby a cathode active material having a high crystallinity and the desired crystalline phase can be obtained.

The firing temperature is from 500 to 1,000° C., preferably from 600 to 1,000° C., particularly preferably from 800 to 950° C. When the firing temperature falls within the above range, a cathode active material having a high crystallinity can be obtained.

The firing time is preferably from 4 to 40 hours, more preferably from 4 to 20 hours.

The firing may be one step firing at from 500 to 1,000° C. or two steps firing wherein after carrying temporary firing at from 400 to 700° C., main firing is carried out at from 700 to 1,000° C. Among them, the two steps firing is preferred, since Li tends to be uniformly dispersed in a cathode active material.

The temperature of the temporary firing in the two steps firing is preferably from 400 to 700° C., more preferably from 500 to 650° C. Further, the temperature of the main firing in the two steps firing is preferably from 700 to 1,000° C., more preferably from 800 to 950° C.

The cathode active material obtained by the production process of the present invention is a cathode active material made of a composite oxide containing at least Li, Mn and Ni. The cathode active material preferably contains Li, Mn, Ni and Co. Further, the cathode active material may contain said another metal element (M').

The cathode active material is in the form of particles. The particulate form of the cathode active material is preferably spherical form, since the packing property of the cathode active material is high at the time of producing a cathode.

In the cathode active material, the proportion of Mn, the proportion of Ni and the proportion of Co to the total of Ni, Co and Mn in the total average composition depend on the total average composition of the carbonate compound which is a starting material. Thus, the proportion of Mn is from 33.3 to 65 mol %, the proportion of Ni is from 17.5 to 50 mol %, and the proportion of Co is from 0 to 33.3 mol %.

The preferred ranges of the proportion of Mn, the proportion of Ni and the proportion of Co to the total of Ni, Co and Mn in the total average composition of the cathode active material are the same as the preferred ranges in the case of the carbonate compound.

The cathode active material obtained by the production process of the present invention has at the central part of particles, a high concentration region (hereinafter referred to also as "high concentration region (H)") where the proportion of Mn is higher than 65 mol % and at the outside of the high concentration region (H), a low concentration region (hereinafter referred to also as "low concentration region (L)") where the proportion of Mn is lower than 65 mol %. The cathode active material has a low concentration region (L) at the outside of a high concentration region (H), whereby the total average composition is controlled within the desired range.

The preferred ranges of the proportion of Mn, the proportion of Ni and the proportion of Co in the transitional metal element in the high concentration region (H) are the same as the preferred ranges in the case of the high concentration region (H').

In the high concentration region (H), the proportion of Mn may be constant, or the proportion of Mn may continuously or intermittently decrease toward the outside. Further, the high concentration region (H) may have a part such that the proportion of Mn continuously or intermittently increases toward the outside. Among them, the proportion of Mn in the high concentration region (H) is preferably constant, since the production is easy, and a lithium ion secondary battery which is excellent in cycle characteristics is easily obtained.

In the transitional metal element in the low concentration region (L), the proportion of Ni, the proportion of Co and the proportion of Mn are not particularly restricted, so far as the proportion of Mn, the proportion of Ni and the proportion of Co to the total of Ni, Co and Mn in the total average composition of the cathode active material fall within the above ranges.

In the low concentration region (L), the proportion of Mn may be constant, or the proportion of Mn may continuously or intermittently decrease toward the outside. Further, the low concentration region (L) may have a part such that the proportion of Mn continuously or intermittently increase toward the outside.

Further, the low concentration region (L) may partially have a region such that the proportion of Mn is the same as or higher than the proportion of Mn of the high concentration region (H).

(Li/X) which is the molar ratio of the content of Li to the transitional metal element (X) in the cathode active material is preferably from 1.1 to 1.4 times, particularly preferably from 1.1 to 1.25 times. When the Li/X falls within the above range, a high discharge capacity tends to be obtained.

The $D_{50}$ of the cathode active material is preferably from 3 to 15 µm, more preferably from 6 to 15 µm, particularly preferably from 6 to 12 µm. When the $D_{50}$ of the cathode active material falls within the above range, a high discharge capacity tends to be obtained.

The cathode active material is preferably second particles made of agglomerated primary particles having $D_{50}$ of from 10 to 500 nm. Thereby, when a lithium ion secondary battery is produced, an electrolyte tends to sufficiently spread into the cathode active material in a cathode.

The $D_{90}/D_{10}$ of the cathode active material is preferably at most 2.3, more preferably at most 2.1, particularly preferably at most 2. When the $D_{90}/D_{10}$ of the cathode active material is at most the above upper limit, a cathode active material having a uniform particle shape whereby excellent cycle can be obtained, tends to be obtained. The lower limit of the $D_{90}/D_{10}$ of the cathode active material is at least 1.

The specific surface area of the cathode active material of the present invention is preferably from 0.1 to 15 $m^2/g$, more preferably from 2 to 10 $m^2/g$, particularly preferably from 4 to 8 $m^2/g$. When the specific surface area of the cathode active material is at least the lower limit, a high discharge capacity tends to be obtained. When the specific surface area of the cathode active material is at most the upper limit, excellent cycle characteristics tend to be obtained.

The specific surface area of the cathode active material is measured by the method described in Examples.

Specifically, the cathode active material is preferably a compound (1) represented by the following formula (1):

$$Li_{1+a}Ni_bCo_cMn_dM'_eO_{2+f} \quad (1)$$

wherein M' is at least one member selected from the group consisting of Mg, Ca, Sr, Ba and Al; a to e are respectively $0.1 \le a \le 0.4$, $0.175 \le b \le 0.5$, $0 \le c \le 0.333$, $0.333 \le d \le 0.65$, $0 \le e \le 0.05$, $0.9 \le b+c+d \le 1.05$; and f is a value to be determined depending on the valence of Li, Ni, Co, Mn and M'.

"a" in the compound (1) is more preferably $0.1 \le a \le 0.25$, since a cathode active material has a high initial discharge capacity and a high initial discharge voltage.

"b" in the compound (1) is more preferably $0.277 \le b \le 0.5$, particularly preferably $0.337 \le b \le 0.5$ for the same reason as the above "a".

"c" in the compound (1) is more preferably $0 \le c \le 0.2$, particularly preferably $0 \le c \le 0.133$ for the same reason as the above "a".

"d" in the compound (1) is more preferably $0.4 \le d \le 0.65$, particularly preferably $0.433 \le d \le 0.6$ for the same reason as the above "a".

"e" in the compound (1) is more preferably $0.001 \le e \le 0.05$, particularly preferably $0.001 \le e \le 0.02$, since the initial discharge capacity and the cycle characteristics are excellent.

<Cathode for Lithium Ion Secondary Battery>

The cathode for a lithium ion secondary battery of the present invention has a cathode current collector and a cathode active material layer formed on the cathode current collector. As the cathode for a lithium ion secondary battery of the present invention, known embodiments may be employed, except that a cathode active material obtained by the production process of the present invention is used.

[Cathode Current Collector]

The cathode current collector may, for example, be an aluminum foil or a stainless steel foil.

[Cathode Active Material Layer]

The cathode active material layer is a layer comprising the cathode active material obtained by the production process of the present invention, an electrically conductive material and a binder. The cathode active material layer may contain another component such as a thickener as the case requires.

The electrically conductive material may, for example, be a carbon black such as acetylene black, graphite or ketjen black. The electrically conductive material may be used alone or in combination of two or more.

The binder may, for example, be a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic acid polymer or copolymer (such as an acrylic copolymer or a methacrylic copolymer). The binder may be used alone or in combination of two or more.

The cathode active material may be used alone or in combination of two or more.

The thickener may, for example, be carboxymethyl cellulose, methyl cellulose, hydroxymethyl cellulose, ethyl cellulose, polyvinyl alcohol, oxidized starch, phosphorylated starch, casein or polyvinylpyrrolidone. The thickener may be used one type or in combination of two or more types.

[Method for Producing Cathode for Lithium Ion Secondary Battery]

As a method for producing the cathode for a lithium ion secondary battery of the present invention, a known production method may be employed except that the cathode active material obtained by the process of the present invention is used. For example, as a method for producing the cathode for a lithium ion secondary battery, the following method may be mentioned.

A cathode active material, an electrically conductive material and a binder are dissolved or dispersed in a medium to obtain a slurry, or a cathode active material, an electrically conductive material and a binder are kneaded with a medium to obtain a kneaded product. Then, the obtained slurry or kneaded product is applied on a cathode current collector by coating to form a cathode active material layer.

<Lithium Ion Secondary Battery>

The lithium ion secondary battery of the present invention comprises the above-described cathode for a lithium ion secondary battery, an anode and a non-aqueous electrolyte.

[Anode]

The anode comprises an anode current collector and an anode active material layer containing an anode active material, formed on the anode current collector.

The anode current collector may, for example, be a metal foil such as a nickel foil or a copper foil.

The anode active material may be any material so long as it is capable of absorbing and desorbing lithium ions at a relatively low potential. It may, for example, be a lithium metal, a lithium alloy, a carbon material, an oxide composed mainly of a metal in Group 14 or 15 of the periodic table, a silicon carbide compound, a silicon oxide compound, titanium sulfide or a boron carbide compound. Further, as the anode active material, an oxide such as iron oxide, ruthenium oxide, molybdenum oxide, tungsten oxide, titanium oxide or tin oxide, or a nitride may, for example, be used.

The carbon material as the anode active material may, for example, be non-graphitizable carbon, artificial graphite, natural graphite, thermally decomposed carbon, cokes (such as pitch coke, needle coke or petroleum coke), graphites, glassy carbons, an organic polymer compound fired product obtained by firing and carbonizing an organic polymer compound (such as a phenol resin or a furan resin) at an appropriate temperature, carbon fibers, activated carbon or carbon blacks.

The metal in Group 14 of the periodic table may, for example, be Si or Sn. The metal in Group 14 of the periodic table is preferably Si.

The anode may be produced, for example, in such a manner that the anode active material is mixed with an organic solvent to prepare a slurry, and the prepared slurry is applied to an anode current collector, followed by drying and pressing.

The non-aqueous electrolyte may, for example, be a non-aqueous electrolytic solution in which an electrolyte salt is dissolved in an organic solvent, a solid electrolyte containing an electrolyte salt, a polymer electrolyte, or a solid or gelled electrolyte in which an electrolyte salt is mixed with or dissolved in e.g. a polymer compound.

As the organic solvent, an organic solvent known for a non-aqueous electrolytic solution may be employed, and it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. Particularly, from the viewpoint of the voltage stability, the organic solvent is preferably a cyclic carbonate such as propylene carbonate, or a chain-structured carbonate such as dimethyl carbonate or diethyl carbonate. The organic solvent may be one type or two or more types.

The solid electrolyte may be any material so long as it has lithium ion conductivity, and either one of an inorganic solid electrolyte and a polymer solid electrolyte may be used.

The inorganic solid electrolyte may, for example, be lithium nitride or lithium iodide.

The polymer solid electrolyte may be an electrolyte containing an electrolyte salt and a polymer compound in which the electrolyte salt is dissolved. The polymer compound in which the electrolyte salt is dissolved may, for example, be an ether polymer compound (such as poly (ethylene oxide) or a crosslinked product of poly(ethylene oxide)), a poly(methacrylate) ester polymer compound or an acrylate polymer compound.

As the matrix of the gelled electrolyte may be any one so long as it is gelled upon absorption of the non-aqueous electrolytic solution, and various polymers may be employed. The polymer compound may, for example, be a fluorinated polymer compound (such as poly(vinylidene fluoride) or poly(vinylidene fluoride-co-hexafluoropropylene)), polyacrylonitrile, a copolymer of polyacrylonitrile, or an ether polymer compound (such as polyethylene oxide, a copolymer of polyethylene oxide, or a crosslinked product of the copolymer). As a monomer to be copolymerized with a polyethylene oxide, methyl methacrylate, butyl methacrylate, methyl acrylate or butyl acrylate may, for example, be mentioned.

As the matrix of the gelled electrolyte, a fluorinated polymer compound is particularly preferred, among the polymer compounds, in view of the stability against the redox reaction.

As the electrolyte salt, any one of those commonly used for lithium ion secondary batteries may be used. For example, $LiClO_4$, $LiPF_6$, $LiBF_4$ or $CF_3SO_3Li$ may be mentioned.

The shape of the lithium ion secondary battery is not particularly limited and may be suitably selected depending on the intended use from e.g. a coin-shape, a sheet-form (film-form), a folded shape, a wound cylinder with bottom and a button shape.

EXAMPLES

Now, the present invention will be described in detail with reference to Examples, but it should be understood that the present invention is by no means restricted to such specific Examples. Ex. 1 and 3 are Examples of the present invention, and Ex. 2, 4 and 5 are Comparative Examples.

[Particle Size ($D_{10}$, $D_{50}$, $D_{90}$)]

The carbonate compound and the cathode active material were sufficiently dispersed in water by ultrasonic treatment, and by measurement by a laser diffraction/scattering type particle size distribution measuring apparatus (apparatus name: MT-3300EX) manufactured by Nikkiso Co., Ltd., frequency distribution and an accumulative volume distribution curve were obtained to obtain a volume-based particle size distribution. The particle size at a point of 50% on the obtained accumulative volume distribution curve was taken as $D_{50}$. Further, $D_{10}$ to be the particle size at a point of 10% and $D_{90}$ to be the particle size at a point of 90% on the obtained accumulative volume distribution curve were also calculated, and $D_{90}/D_{10}$ was obtained.

[Specific Surface Area (SSA)]

The specific surface areas (SSA) of the carbonate compound and the cathode active material were measured by means of a BET (Brunauer, Emmett, Teller) method using a specific surface area measuring apparatus (apparatus name: HM model-1208) manufactured by MOUNTECH Co., Ltd.

[Compositional Analysis (Ni, Co and Mn)]

Compositional analysis of the carbonate compound was carried out by a plasma emission spectrometer (model: SPS3100H manufactured by SII NanoTechnology Inc.).

[Observation of Cross Section Shape of Cathode Active Material]

The cathode active materials obtained in Ex. 3 and Ex. 5 were embedded with an epoxy resin and mechanical polished to expose smooth cross sections of the cathode active materials. Then, the cross sections of the exposed cathode active materials were observed by a scanning electron microscope (SEM), manufactured by JEOL Ltd.

Ex. 1

Preparation of Carbonate Compound

Nickel(II) sulfate hexahydrate, cobalt(II) sulfate heptahydrate and manganese(II) sulfate pentahydrate were dissolved in distilled water so that the molar ratio of Ni, Co and Mn would be as shown in Table 1, and that the total amount of the sulfates would be 1.5 mol/kg, to prepare each 2 kg of aqueous sulfate solutions 1-1 and 1-2. Further, 0.92 kg of sodium carbonate was dissolved in 4.88 kg of distilled water to prepare 5.8 kg of an aqueous carbonate solution (pH adjusting solution).

Then, into a 2 L baffle-equipped glass mixing tank, distilled water was put and heated to 50° C. by a mantle heater, the aqueous sulfate solution 1-1 was added at a rate of 10.0 g/min for 3 hours with stirring by a paddle type stirring blade, and then the aqueous sulfate solution 1-2 was added at a rate of 10.0 g/min for 3 hours with stirring by a paddle type stirring blade. During the addition, the aqueous carbonate solution (pH adjusting solution) was added so as to keep the pH of the mixed solution to be 8.0, and thereby a carbonate compound was precipitated. The aqueous sulfate solution in the precipitation reaction was adjusted so as to have proportions of Ni, Co and Mn shown in Table 3. Further, during the precipitation reaction, the liquid was continuously withdrawn using filter cloth so that the liquid amount in the reactor would not exceed 2 L.

In order to remove impurity ions from the obtained carbonate compound, pressure filtration and dispersion in distilled water were repeated to wash the carbonate compound. Washing was completed at a point where the electrical conductivity of the supernatant liquid became 20 mS/m, and drying was carried out at 120° C. for 15 hours to obtain a carbonate compound.

(Preparation of Cathode Active Material)

36 g of the carbonate compound and 12.94 g of lithium carbonate were mixed so that the molar ratio (Li/X) of the amount of Li contained in lithium carbonate to the total amount of the transition metal element (X) (the total amount of Mn, Ni and Co) contained in the carbonate compound would be 1.145. Further, using an electric furnace (FO510 manufactured by Yamato Scientific Co., Ltd.), while flowing the air at 133 mL/min per 1 L of the internal capacity, the mixture was subjected to temporary firing at 600° C. for 5 hours and then to main firing at 850° C. for 16 hours to obtain a cathode active material.

Ex. 2

Nickel(II) sulfate hexahydrate, cobalt(II) sulfate heptahydrate and manganese(II) sulfate pentahydrate were dissolved in distilled water so that the molar ratio of Ni, Co and Mn would be as shown in Table 1, and that the total amount of the sulfates would be 1.5 mol/kg, to prepare 4 kg of an aqueous sulfate solution 1-3. Further, 0.92 kg of sodium carbonate was dissolved in 4.88 kg of distilled water to prepare 5.8 kg of an aqueous carbonate solution (pH adjusting solution).

Then, a carbonate compound was prepared in the same manner as in Example 1, except that into a 2 L baffle-equipped glass mixing tank, distilled water was put and heated to 30° C. by a mantle heater, and the aqueous sulfate solution 1-3 was added at a rate of 10.0 g/min for 6 hours with stirring by a paddle type stirring blade.

Further, a cathode active material was obtained in the same manner as in Ex. 1 by using the above carbonate compound.

TABLE 1

| Aqueous sulfate solution | Ni [mol %] | Co [mol %] | Mn [mol %] |
| --- | --- | --- | --- |
| 1-1 | 21.90 | 5.70 | 72.40 |
| 1-2 | 58.10 | 5.70 | 36.20 |
| 1-3 | 40.00 | 5.70 | 54.30 |

Ex. 3

Preparation of Carbonate Compound

Nickel(II) sulfate hexahydrate, cobalt(II) sulfate heptahydrate and manganese(II) sulfate pentahydrate were dissolved in distilled water so that the molar ratio of Ni, Co and Mn would be as shown in Table 2, and that the total amount of the sulfates would be 1.5 mol/kg, to prepare 2 kg of an aqueous sulfate solution 2-1, 4.5 kg of an aqueous sulfate solution 2-2 and 3 kg of an aqueous sulfate solution 2-3. Further, 1.9 kg of sodium carbonate was dissolved in 10.1 kg of distilled water to prepare 12 kg of an aqueous carbonate solution (pH adjusting solution).

TABLE 2

| Aqueous sulfate solution | Ni [mol %] | Co [mol %] | Mn [mol %] |
| --- | --- | --- | --- |
| 2-1 | 25.43 | 8.57 | 66.00 |
| 2-2 | 44.20 | 8.57 | 47.23 |
| 2-3 | 38.57 | 8.57 | 52.86 |

Then, into a 2 L baffle-equipped glass mixing tank, distilled water was put and heated to 30° C. by a mantle heater; at a rate of 5.0 g/min with stirring by a paddle type stirring blade, the aqueous sulfate solution 2-1 was added for 6 hours, the aqueous sulfate solution 2-2 was added for 14 hours, and the aqueous sulfate solution 2-3 was added for 9 hours, in this order; and the aqueous carbonate solution (pH adjusting solution) was added so as to keep the pH of the mixed solution to be 8.0, to precipitate a carbonate compound. The aqueous sulfate solution in the precipitation reaction was adjusted so as to have proportions of Ni, Co and Mn shown in Table 3. Further, during the precipitation reaction, the liquid was continuously withdrawn using filter cloth so that the liquid amount in the reactor would not exceed 2 L.

The obtained carbonate compound was washed in order to remove impurity ions in the same manner as in Ex. 1 and dried.

(Preparation of Cathode Active Material)

36 g of the carbonate compound and 12.70 g of lithium carbonate were mixed so that Li/X would be 1.125. Further, using an electric furnace (FO510 manufactured by Yamato Scientific Co., Ltd.), while flowing the air at 133 mL/min per 1 L of the internal capacity, the mixture was subjected to temporary firing at 600° C. for 5 hours and then to main firing at 850° C. for 16 hours to obtain a cathode active material.

Ex. 4

4.5 kg of an aqueous sulfate solution 2-3 was prepared in the same manner as in Ex. 3. Further, 1.9 kg of sodium carbonate was dissolved in 10.1 kg of distilled water to prepare 12 kg of an aqueous carbonate solution (pH adjusting solution).

Then, a carbonate compound was prepared in the same manner as in Example 3, except that into a 2 L baffle-equipped glass mixing tank, distilled water was put and heated to 30° C. by a mantle heater, and as the aqueous sulfate solution, only the aqueous sulfate solution 2-3 was added at a rate of 5.0 g/min for 14 hours with stirring by a paddle type stirring blade.

Further, a cathode active material was obtained in the same manner as in Example 3 by using the above carbonate compound.

Ex. 5

A carbonate compound was prepared in the same manner as in Ex. 4, except that the aqueous sulfate solution 2-3 was added at a rate of 2.5 g/min for 28 hours. Further, a cathode active material was obtained in the same manner as in Ex. 3 by using the above carbonate compound.

Results of the compositional analysis of Ni, Co and Mn in the carbonate compound obtained in each Ex., the particle size ($D_{10}$, $D_{50}$ and $D_{90}$) of the carbonate compound and the cathode active material, $D_{90}/D_{10}$ and the specific surface area (SSA) are shown in Table 3.

Figure 2:
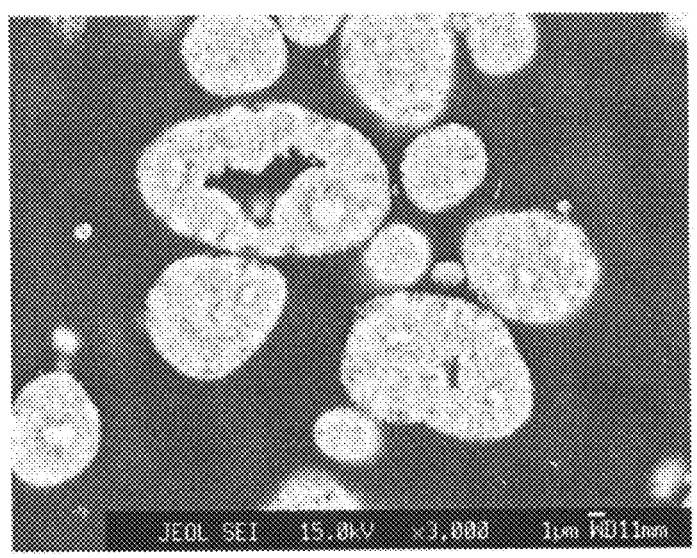
FIG. 2 is a scanning electron microscope photograph showing a cross section of the cathode active material of Ex 5.

Further, FIG. 1 is a SEM photograph of a cross section of the cathode active material obtained in Ex. 3, and FIG. 2 is an SEM photograph of a cross section of the cathode active material obtained in Ex. 5.

cathode active material of which the particle size is uniform and the particle shape is good were obtained. Further, in Ex. 5 wherein the proportion of Mn in the aqueous sulfate solution at the initial of mixing was at most 65 mol %, and the addition time was the same as in Ex. 3, $D_{90}/D_{10}$ was not substantially improved.

[Evaluation of Cycle Characteristics]
(Production of Cathode Sheet)

Each of the cathode active materials obtained in Ex., acetylene black as an electrical conductive material and polyvinylidene fluoride (binder) were added to N-methyl-pyrrolidone in a mass ratio of 80:10:10 to prepare a slurry.

Then, the slurry was applied on one side of an aluminum foil (cathode current collector) having a thickness of 20 μm by means of a doctor blade, followed by drying at 120° C. and then by roll pressing twice to prepare a cathode sheet.

(Production of Lithium Ion Secondary Battery)

Using a circle having a diameter of 18 mm punched out from the obtained cathode sheet as a cathode, a stainless steel simple sealed cell type lithium ion secondary battery was assembled in an argon glove box. A stainless steel plate having a thickness of 1 mm was used as an anode current collector, and a metal lithium foil having a thickness of 500 μm was formed on the anode current collector to obtain an anode. Further, as a separator, a porous polypropylene having a thickness of 25 μm was used. Further, as an electrolytic solution, a solution having $LiPF_6$ dissolved at a concentration of 1 mol/dm³ in a solvent mixture of ethylene carbonate (EC) and diethyl carbonate (DEC) in a mass ratio of 1:1 was used.

TABLE 3

| | Aqueous sulfate solution | | | | Carbonate compound | | | | | | | | | | Cathode active material | | | | |
|---|---|---|---|---|---|---|---|---|---|---|---|---|---|---|---|---|---|---|---|
| | Addition time | Composition of charged sulfate (A) [mol %] | | | Compositional analysis of transitional metal element (X) [mol %] | | | Particle size [μm] | | | $D_{90}/D_{10}$ | SSA [m²/g] | Li/X | Particle size [μm] | | | $D_{90}/D_{10}$ | SSA [m²/g] |
| | [hour] | Ni | Co | Mn | Ni | Co | Mn | $D_{10}$ | $D_{50}$ | $D_{90}$ | | | | $D_{10}$ | $D_{50}$ | $D_{90}$ | | |
| Ex. 1 | 6 | 40.00 | 5.70 | 54.30 | 39.76 | 5.85 | 54.38 | 6.9 | 9.5 | 13.7 | 1.98 | 174.1 | 1.145 | 4.6 | 7.1 | 10.7 | 2.3 | 5.38 |
| Ex. 2 | 6 | 40.00 | 5.70 | 54.30 | 40.01 | 5.75 | 54.24 | 6.2 | 11.1 | 18.1 | 2.90 | 210.8 | 1.145 | 5.6 | 9.1 | 14.6 | 2.6 | 7.71 |
| Ex. 3 | 29 | 38.57 | 8.57 | 52.86 | 38.32 | 8.65 | 53.03 | 6.8 | 9.2 | 13.3 | 1.96 | 179.9 | 1.125 | 6.1 | 8.2 | 11.7 | 1.91 | 9.6 |
| Ex. 4 | 14 | 38.57 | 8.57 | 52.86 | 38.30 | 8.60 | 53.10 | 6.1 | 10.7 | 16.9 | 2.76 | 214.4 | 1.125 | 5.9 | 9.6 | 14.9 | 2.53 | 10.0 |
| Ex. 5 | 28 | 38.57 | 8.57 | 52.86 | 38.48 | 8.58 | 52.94 | 6.3 | 10.4 | 16.4 | 2.62 | 208.0 | 1.125 | 6.1 | 9.4 | 14.4 | 2.36 | 9.2 |

As shown in Table 3, as compared with Ex. 2 wherein the proportion of Mn was at most 65 mol %, in Ex. 1 wherein the proportion of Mn in the aqueous sulfate solution at the initial of mixing was higher than 65 mol %, $D_{90}/D_{10}$ of the carbonate compound and $D_{90}/D_{10}$ of the cathode active material were lower, and the carbonate compound and the cathode active material having a more uniform particle size were obtained. Further, as compared with Ex. 2, in Ex. 1, the specific surface area of the carbonate compound and the specific surface area of the cathode active material were smaller, and good carbonate compound of which particle shape is close to spherical and good cathode active material were obtained.

Similarly, as compared with Ex. 4 wherein the proportion of Mn was at most 65 mol %, in Ex. 3 wherein the proportion of Mn in the aqueous sulfate solution at the initial of mixing was higher than a (Measurement of Discharge Capacity Retention)

The obtained lithium ion secondary battery was connected to a charge and discharge evaluation apparatus (manufactured by TOYO SYSTEM Co., Ltd., apparatus name: TOSCAT-3000), and charged to 4.6 V with a load current of 20 mA per 1 g of the cathode active material and discharged to 2.0 V with a load current of 20 mA per 1 g of the cathode active material to carry out an activation treatment. Then, a charge/discharge cycle of charging to 4.5 V with a load current of 200 mA per 1 g of the cathode active material and discharging to 2.0 V with a load current of 200 mA per 1 g of the cathode active material, was repeated 110 times.

The discharge capacity at the time of the activation treatment was taken as "the initial discharge capacity", the discharge capacity in the 110th cycle was taken as "the discharge capacity after cycles", and the ratio of the discharge capacity after cycles to the discharge capacity in the third cycle was taken as "the discharge capacity retention".

The results of measuring the initial discharge capacity and the discharge capacity retention in each Ex. are shown in Table 4.

TABLE 4

|       | Initial discharge capacity [mAh/g] | Discharge capacity retention [%] |
|-------|------------------------------------|----------------------------------|
| Ex. 1 | 231.8 | 74.2 |
| Ex. 2 | 231.6 | 52.1 |
| Ex. 3 | 220.9 | 74.6 |
| Ex. 4 | 235.3 | 60.8 |
| Ex. 5 | 236.8 | 70.3 |

As shown in Table 4, as compared with Ex. 2 wherein a cathode active material having a similar composition was obtained by using a sulfate having a proportion of Mn of at most 65 mol % and starting precipitation reaction for a carbonate, in Ex. 1 wherein the cathode active material was obtained by the production process of the present invention, the cycle characteristics were excellent. Further, in Ex. 1, a sufficient initial discharge capacity was obtained.

Further, as compared with Ex. 4 wherein a cathode active material having a similar composition was obtained by starting mixing by using a sulfate having a proportion of Mn of at most 65 mol %, in Ex. 3 wherein the cathode active material was obtained by the production process of the present invention, the cycle characteristics were excellent. Further, in Ex. 3, a sufficient initial discharge capacity was obtained.

Further, in Ex. 3, the cycle characteristics were excellent, even as compared with Ex. 5 wherein the sulfate having an Mn proportion of at most 65 mol % was used, and the addition time was the same as in Ex. 3. Further, as shown in FIGS. 1 and 2, voids were formed in the cathode active material of Ex. 5, while voids were not formed in the cathode active material of Ex. 3.

As described above, by the production process of the present invention, a cathode active material having a uniform particle size and good particle shape in which the formation of voids is suppressed, is obtained, and by using the cathode active material, a lithium ion secondary battery having excellent cycle characteristics can be obtained.

INDUSTRIAL APPLICABILITY

According to the present invention, by using a carbonate compound obtained by the production process of the present invention, a cathode active material having a uniform particle size and a good shape in which the formation of voids is suppressed, is obtained. Accordingly, a lithium ion secondary battery having a sufficient discharge capacity and excellent cycle characteristics can be obtained.

This application is a continuation of PCT Application No. PCT/JP2014/053085 filed on Feb. 10, 2014, which is based upon and claims the benefit of priority from Japanese Patent Application No. 2013-027043 filed on Feb. 14, 2013. The contents of those applications are incorporated herein by reference in their entireties.

What is claimed is:

1. A process for producing a carbonate compound, which comprises mixing the following sulfate (A) and the following carbonate (B) in the form of aqueous solutions and controlling the proportion of Mn to the total of Ni, Co and Mn contained in the sulfate (A) to be higher than 65 mol % at the initiation of the mixing, to precipitate a carbonate compound having a proportion of Mn of from 33.3 to 65 mol %, a proportion of Ni of from 17.5 to 50 mol % and a proportion of Co of from 0 to 33.3 mol % to the total of Ni, Co and Mn in the total average composition:

sulfate (A): a sulfate comprising a sulfate of Mn and a sulfate of Ni, or a sulfate comprising a sulfate of Mn, a sulfate of Ni and a sulfate of Co, and carbonate (B): at least one carbonate selected from the group consisting of sodium carbonate and potassium carbonate.

2. The process for producing a carbonate compound according to claim 1, wherein at the initiation of mixing the sulfate (A) and the carbonate (B), a pH of the mixed solution in a mixing tank is maintained at from 7 to 12.

3. The process for producing a carbonate compound according to claim 1, wherein a concentration of transitional metal element (X) comprising Mn, Ni and Co in the aqueous solution of the sulfate (A) is from 0.1 to 3 mol/kg.

4. The process for producing a carbonate compound according to claim 1, wherein a concentration of the carbonate (B) in the aqueous solution of the carbonate (B) is from 0.1 to 2 mol/kg.

5. The process for producing a carbonate compound according to claim 1, which comprises mixing the sulfate (A) and the carbonate (B) in the form of aqueous solutions, and controlling in a first precipitation step, the proportion of Mn to the total of Ni, Co and Mn contained in the sulfate (A) to be higher than 65 mol % and controlling in a second precipitation step, the proportion of Mn to the total of Ni, Co and Mn contained in the sulfate (A) to be less than 65 mol %, to precipitate a carbonate compound having the proportion of Mn of from 33.3 to 65 mol %, the proportion of Ni of from 17.5 to 50 mol % and the proportion of Co of from 0 to 33.3 mol % to the total of Ni, Co and Mn in the total average composition.

6. The process for producing a carbonate compound according to claim 5, wherein in the first precipitation step, the proportion of Mn in the sulfate (A) is higher than 65 mol % and at most 100 mol %, the proportion of Ni is from 0 to 35 mol %, and the proportion of Co is from 0 to 33.3 mol %.

7. A process for producing a cathode active material, which comprises mixing the carbonate compound obtained by the process as defined in claim 1 and lithium carbonate, followed by firing at from 500 to 1,000° C.

8. The process for producing a cathode active material according to claim 7, wherein a number of moles of Li contained in the lithium carbonate is from 1.1 to 1.4 times a number of moles of the total of Ni, Co and Mn contained in the carbonate compound.

9. The process for producing a cathode active material according to claim 7, wherein the cathode active material to be obtained is a compound (1) represented by the following formula (1):

$$Li_{1+a}Ni_bCo_cMn_dM'_eO_{2+f} \quad (1)$$

wherein M' is at least one member selected from the group consisting of Mg, Ca, Sr, Ba and Al; a to e are respectively $0.1 \le a \le 0.4$, $0.175 \le b \le 0.5$, $0 \le c \le 0.333$, $0.333 \le d \le 0.65$, $0 \le e \le 0.05$, $0.9 \le b+c+d \le 1.05$; and f is a numerical value to be determined depending on a valence of Li, Ni, Co, Mn and M'.

10. A cathode for a lithium ion secondary battery, comprising a cathode current collector and a cathode active material layer formed on the cathode current collector, wherein the cathode active material layer contains the cathode active material obtained by the process as defined in claim 7, an electrically conductive material and a binder.

11. A lithium ion secondary battery comprising the cathode for a lithium ion secondary battery as defined in claim 10, an anode and a non-aqueous electrolyte.

* * * * *